United States Patent [19]

Wolf et al.

[11] 4,169,628
[45] Oct. 2, 1979

[54] PANEL FOR A SEAT

[75] Inventors: Emanuel Wolf, Thalwil; Alfred Weber, Schaffhausen, both of Switzerland

[73] Assignee: Swiss Aluminium Ltd., Chippis, Switzerland

[21] Appl. No.: 937,931

[22] Filed: Aug. 30, 1978

[51] Int. Cl.² ............................................... A47C 7/02
[52] U.S. Cl. .............................. 297/454; 297/DIG. 2
[58] Field of Search ....................... 297/452, 454–459, 297/DIG. 1, DIG. 2; 267/83; 5/345 R, 361 B

[56] References Cited

U.S. PATENT DOCUMENTS

| | | | |
|---|---|---|---|
| 3,164,110 | 1/1965 | Bofinger | 297/DIG. 2 |
| 3,713,697 | 1/1973 | Koepke | 297/456 |
| 4,077,665 | 3/1978 | Storch | 297/457 X |

*Primary Examiner*—James C. Mitchell
*Attorney, Agent, or Firm*—Bachman and LaPointe

[57] ABSTRACT

An improved seat for use in a vehicle is disclosed in which the back portion and the sitting portion of the seat is comprised of a single unitary composite structure. The composite structure comprises a core layer of a high polymer organic material disposed between two metal sheets. A roughened plastic protective layer is disposed on one of the metal sheets thereby providing a relatively non-slick surface on which a passenger may sit.

12 Claims, 4 Drawing Figures

PANEL FOR A SEAT

BACKGROUND OF THE INVENTION

The present invention relates to an improved seat for use in a vehicle in which the seat portion and the back portion are formed of a single unitary composite structure.

Heretofore, single unitary one piece vehicle seats were formed out of fiberglass reinforced plastic. A number of disadvantages are associated with these seats due to their brittleness. As a result of the fiberglass, injury can result from splinters when the seat brakes. While this problem can be solved by eliminating fiberglass, unreinforced plastic seats are in general not stable in shape or sufficiently strong for use in vehicles.

In an effort to cure the above-noted deficiencies in plastic and fiberglass reinforced plastic seats, attempts have been made to use seats formed out of steel sheet. However, a number of disadvantages, mainly difficulties in shaping the steel sheets into suitable designs for seats and the lack of comfort of the steel seat when compared with seats with plastic surfaces have made such attempts unsuccessful.

Accordingly, it is the principal object of the present invention to provide a seat which offers adequate safety when destroyed or damaged and yet remains consistently stable in shape.

A further object of the present invention is to improve the optical design of seats used in vehicles.

A still further object of the present invention is to provide a seat with surface properties which would give better comfort to the passenger.

Further objects and advantages of the present invention will appear hereinbelow.

SUMMARY OF THE INVENTION

In accordance with the present invention, it has been found that the foregoing objects and advantages may be readily obtained.

The seat of the present invention comprises a composite structure which has a high polymer organic material core and metal sheet on both sides thereof. Part of the edge of the composite structure is bent out of the plane of the rest of the structure and is provided with at least one recess cut in at the edge of the structure. The seat preferably comprises a composite of a thermoplastic core with somewhat thinner light metal or light metal alloy sheet on both sides of the core. The seat composed of the aforenoted composite structure can be very easily shaped and results in an extremely stable construction, the surface of which is comfortable to the user of the seat. To further improve the seat of the present invention for sitting comfort, one of the metal sheets can be covered with a layer of plastic which can be roughened and profiled if desired. Such a design allows for a non-slick surface as well as a pleasant surface appearance.

The composite structure for the manufacture of the seat of the present invention can be in the form of two opposite facing tongues, one of the tongues forming the seat portion and the other the back portion of the seat on either side of a bend axis. In plane view, the tongue-shaped parts taper away from the bend axis so that the area where the seat bends is the broadest part of the seat structure.

In order to produce a better shape for sitting, the ends of the seat portion in the back portion farthest away from the bend axes are bent away from the side on which the person sits. These parts are then appropriately shaped to provide more comfort for the back of the knee and the nape of the neck of the seated person. The long edges of the seat and back portions are bent upwards so as to better hold the body of the seated person.

In accordance with the present invention, the non-curved areas of each of the tongue-shaped parts can be approximately rectangular. Because the tongue-shaped parts taper away from the bent area dividing the seat and back portion, the curved edge portion along the long edges of the seat and back portions becomes broader approaching the bent area thus further increasing the sitting comfort of the passenger.

In order to make the seat of the present invention particularly stable in shape, the seat portion thereof can be anti-elastically shaped in two counterposing directions of curvature. Parts designed as above with crossing tension and pressure lines provide exceptional shape stability which heretofore has not been used in prior art seats.

A further feature of the present invention provides recesses at both sides of the seat in the bent area region between the seat and back portions of the seat. These recesses extend preferably to the limit of the non-curved areas of the tongue-shaped parts, and at least to the limit of the region where the side bends upwardly. The recesses at the edge also allow easier bending of the already bent composite seat, and do so without causing any sharp folds. After this forming of the composite seat, a pre-shaped insert is preferably provided in each of the recesses with the surface of the inserts being aligned with the inner surface of the seat portion of the seat. This insert forms part of a pre-curved stiffener which is attached to both tongue-shaped parts and maintains the sitting angle of the seat without reducing the limited elasticity thereof.

In order to keep the weight of the seat light, the stiffener is preferably a strut in the form of a light metal casting. The stiffener gives support to the seat. Furthermore, a bracket may be attached to the stiffener so as to act as an arm rest for the seat.

BRIEF DESCRIPTION OF THE DRAWINGS

Further advantages and features of the present invention will be understood from a consideration of the following drawings which.

DETAILED DESCRIPTION

Figure 3:
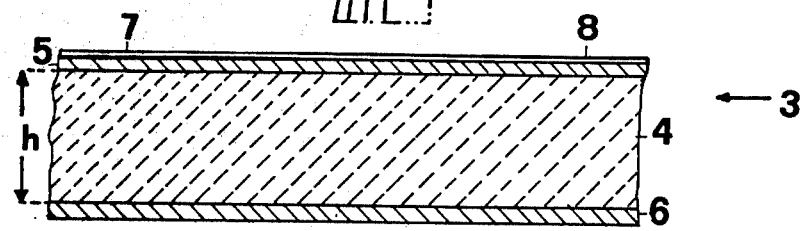
FIG. 3 is an enlarged view of the composite structure of the seat of the present invention.

A seat composite structure S for an automobile seat R, fixed to the floor 2 of a vehicle (not shown) by means of a base 1, is made of a formed multi-layered composite sheet 3. This composite sheet comprises, as shown in FIG. 3, a core 4 of a thickness h equal to 5 mm for example, and made of a high polymer organic material, for example a plastomer, covered on both sides by metal sheets 5 and 6. The metal sheets can be applied to the core in any manner known in the art.

A protective layer of plastic, such as polymerisate may be applied to one of the metal sheets 5 or 6. The plastic surface may be roughened so as to provide a slick-free surface which is also pleasant in appearance.

Figure 4:
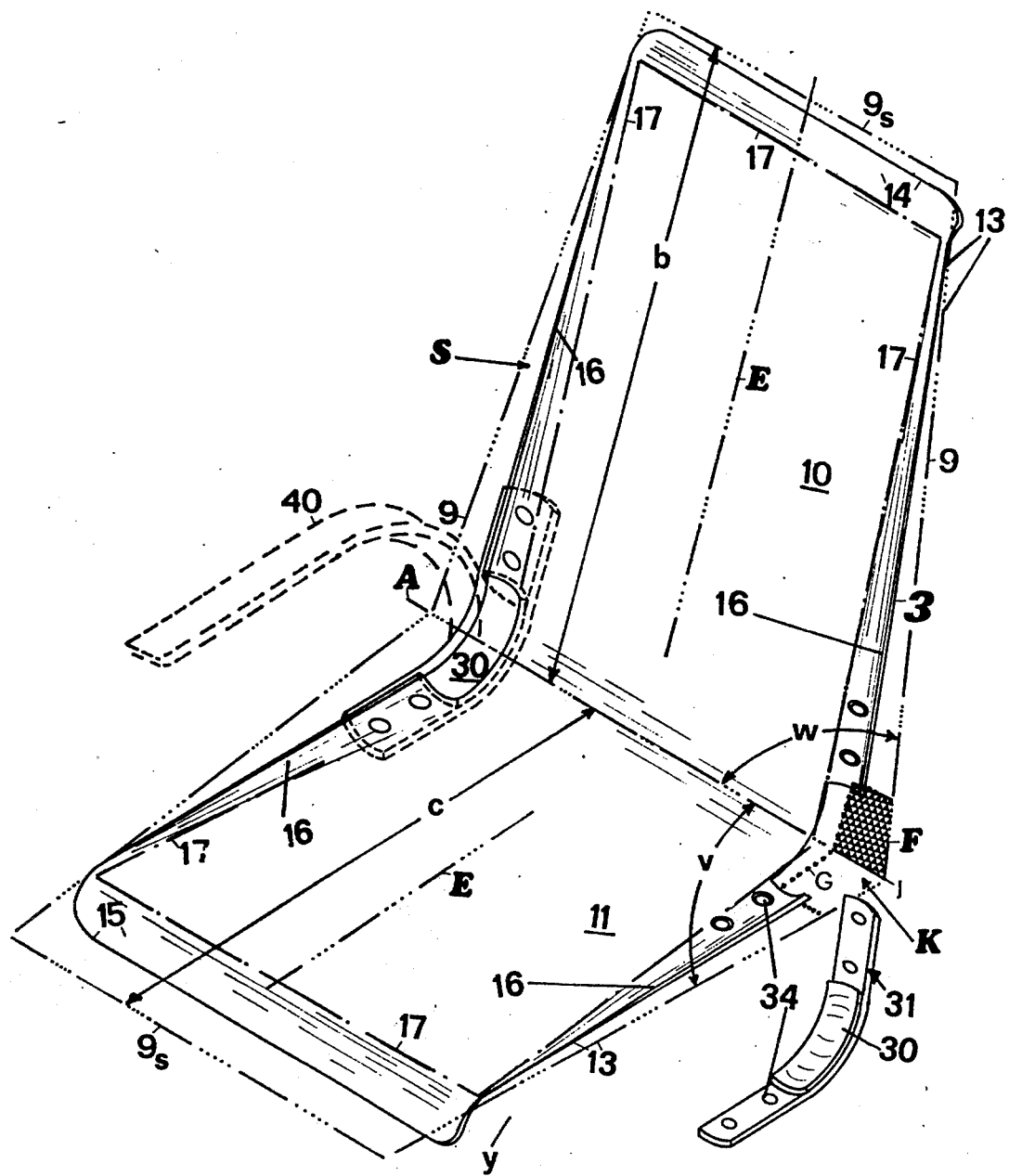
FIG. 4 is a perspective view of the seat of FIG. 2 so as to show further details.

As indicated in FIG. 4, the composite S is formed out of a unitary one piece composite sheet 3 having contours 9 which comprise two tongue-shaped areas 10 and 11 on opposite sides of an axis A where the composite is bent between the seat portion and the back portion. The length b of the part 10 which forms the back portion of the seat is larger than the length c of the part 11 which forms the seat portion. Both parts 10 and 11 as viewed in a plane or end view taper away from the axis A so that their sides 13 on both sides of the axis A form an acute angle W and V, respectively, with the axis of symmetry E passing through the axis A at right angles.

As indicated by F in FIG. 4, recesses are cut out of the edges of parts 10 and 11 on both sides of the axis A. The neighboring recesses form in plan view a five-sided recess K together with the base line G running through the axis A, the mid-point F of which determines the axis A along which the seat is bent.

In forming the seat R the narrow edges $9_s$ are bent out of their plane in the direction of the arrow y as shown in FIG. 4 so as to form curved ends 14 and 15, respectively, on the back portion 10 and the seat portion 11 of the seat. The long edges 9 are bent in the opposite sense as the narrow edges $9_s$ so as to form curved edges 16 at the sides of both portions 10 and 11. The back portion 10 is then bent along the axis A as shown in FIG. 1 in the direction Z towards the seat portion 11, or vice versa, until both the seat portion and the back portion form a sitting angle t of about 120°.

The non-curved areas of the tongue-shaped parts of back portion 10 and seat portion 11 are rectangular in shape as described by the contour lines 17 in FIG. 4. The base lines G of the recesses K form parts of the edges of the rectangles as defined by contour lines 17.

Figure 1:
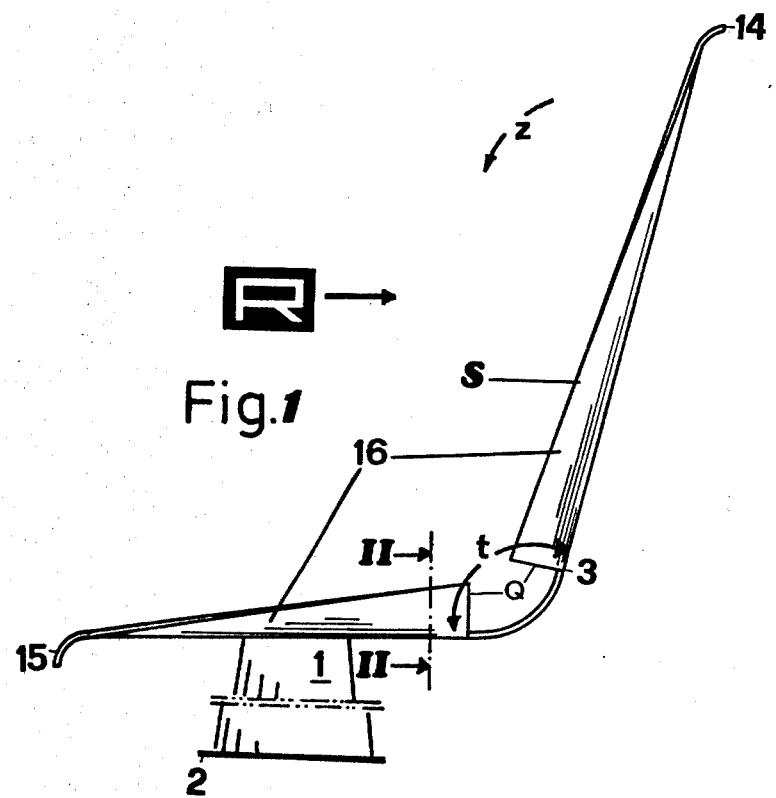
FIG. 1 is an end view of a seating device in accordance with the principals of the present invention.
Figure 2:
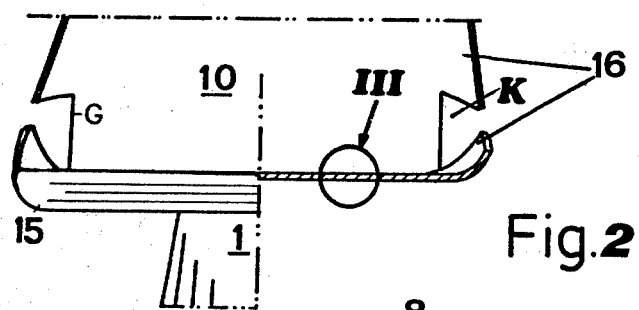
FIG. 2 is a sectional view of the seat of FIG. 1 taken along lines II—II in FIG. 1.

The base line G of each recess K curves around the axis A in the bent seat S and terminates at the transverse edges indicated as Q in FIG. 1.

Each edge recess K accommodates an appropriately shaped attachment 30 of a curved stiffener 31 which is in the form of a metal casting and is fixed to the composite structure of seat S by means of screws (not shown) passing through holes 34 in the composite sheet 3 and the stiffener 31. The stiffener 31 aids in maintaining the seating angle of the seat without reducing the limited elasticity thereof.

As can be seen in FIG. 4, the phantom lines 40, indicating an arm, is a curved part which may be attached to the stiffener 31 and mounted to the seat together with the stiffener through corresponding holes 34. Thus, arm 40 acts as an arm rest for the seat structure.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An improved seat comprising:
   a seat portion having a seating surface;
   a back portion having a back support surface, said back support surface being disposed from said seating surface about an axis so as to form therewith an obtuse angle;
   wherein said seat portion and said back portion are formed of a single unitary composite structure comprising a core layer of high polymer organic material having a first surface corresponding to said seating surface and said back support surface and a second surface substantially parallel to said first surface, and at least one metal sheet layer bonded to one of said first and second surfaces.

2. A seat according to claim 1 including a second metal sheet layer bonded to the other of said surfaces of said core.

3. A seat according to claim 2 including a profiled plastic layer bonded to said metal sheet layer on said first surface.

4. A seat according to claim 1 further comprising two elongated edge portions extending substantially perpendicular to said axis, said elongated portions curve upward out of the plane of said seating surface and said back support surface wherein said edge portions are provided with a recess in the region of said axis.

5. A seat according to claim 4 further comprising stiffener means secured to said seat portion and said back portion, said stiffener means includes insert means secured thereto said insert means being fitted in said recesses.

6. A seat according to claim 5 further comprising arm rest means secured to said stiffener means.

7. A seat according to claim 6 wherein said arm rest means and said stiffener means comprise an aluminum or aluminum alloy casting.

8. A seat according to claim 4 further comprising two narrow edge portions extending in a plane substantially parallel to said axis, said narrow edge portions curve downwardly out of the plane of said seating surface and said back support surface.

9. A seat according to claim 8 wherein said seat is broadest in the region of said axis and said elongated edge portions form with said axis an acute angle.

10. A seat according to claim 3 wherein said seating surface is anti-elastically shaped in two counterposing directions of curvature.

11. A seat according to claim 4 wherein said second surface includes a base for attaching said seat to a vehicle.

12. A seat according to claim 8 wherein said uncurved portions of said seating surface and said back support surface are substantially rectangular.

* * * * *